Aug. 30, 1932.  G. H. LEWIS  1,874,768
TRACTOR SPADE PLOW
Filed June 15, 1931  3 Sheets-Sheet 1

Inventor
George H. Lewis
Attorney

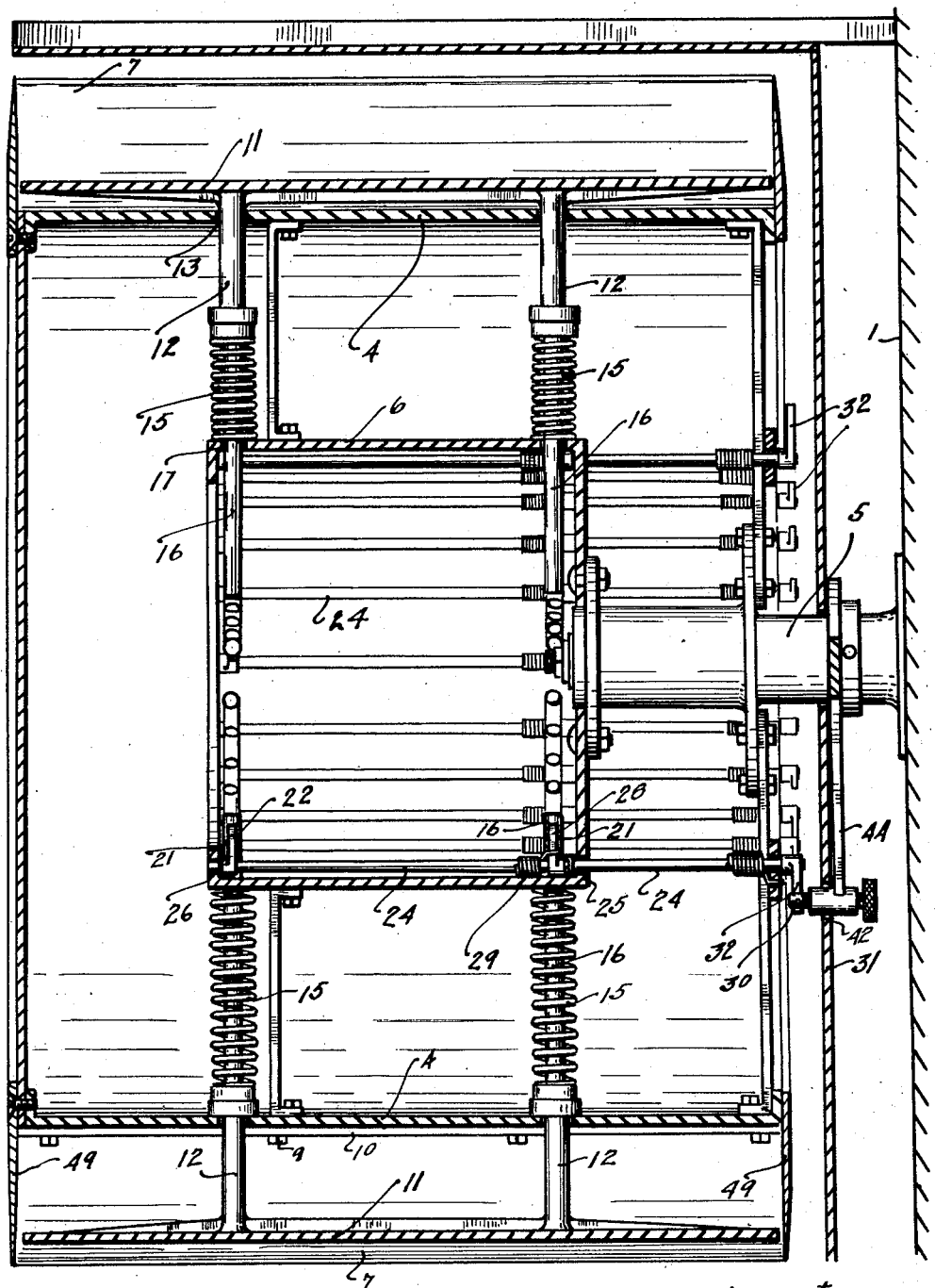

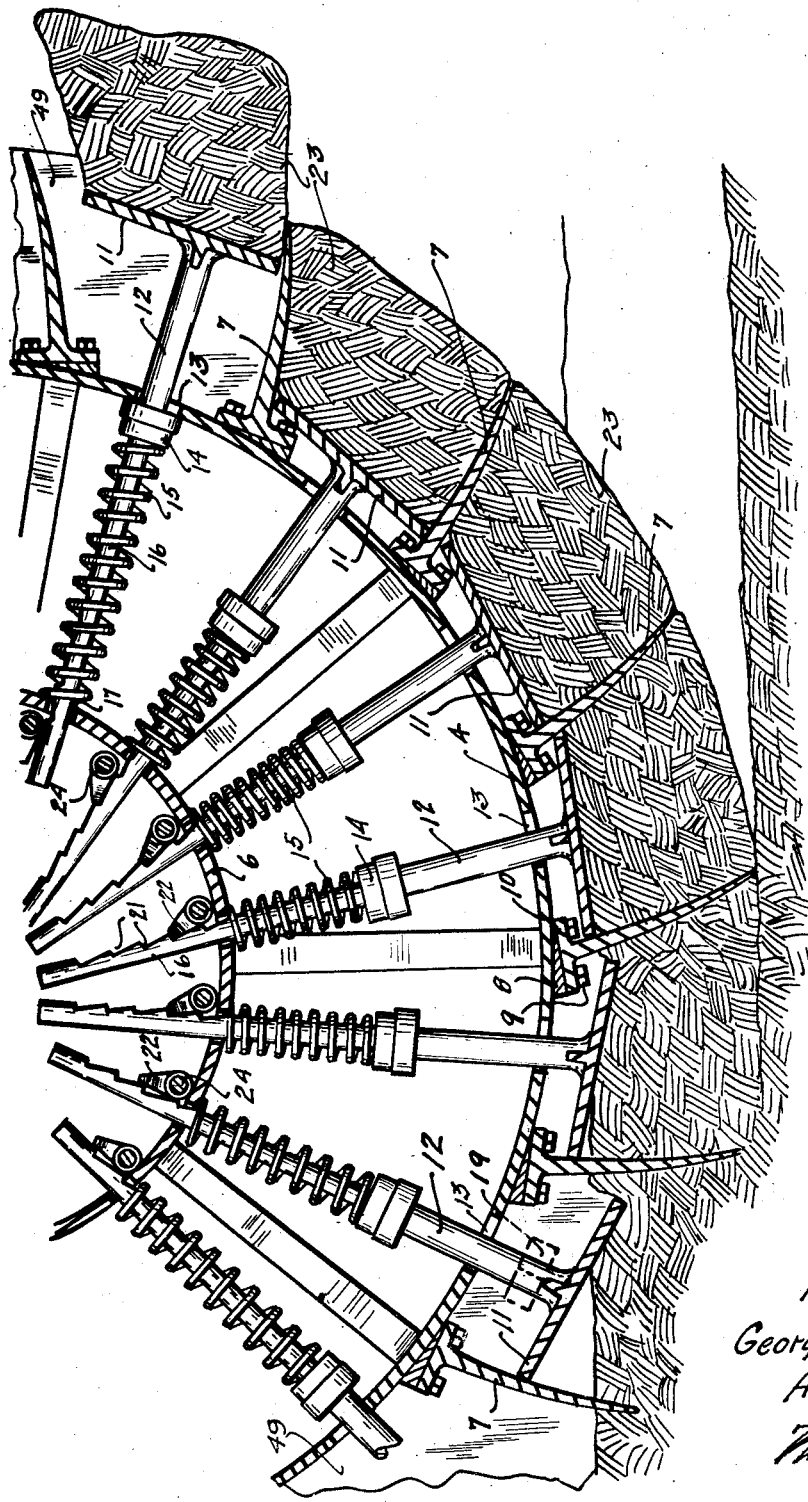

Patented Aug. 30, 1932

1,874,768

UNITED STATES PATENT OFFICE

GEORGE H. LEWIS, OF KENT, OREGON, ASSIGNOR OF ONE-HALF TO FRANK WINTERS, OF PORTLAND, OREGON

TRACTOR SPADE PLOW

Application filed June 15, 1931. Serial No. 544,389.

My invention relates to plows, cultivators, and other ground tilling implements. The device is used to thoroughly agitate and aerate the ground to be plowed, tilled, or cultivated.

The invention is primarily adapted for use in conjunction with wheeled tractors. A plurality of shovel blades extend outwardly from the rim wheel of the tractor, and a compressible member is disposed between the respective shovel blades that traps the soil between the respective shovel blades until a predetermined position is reached in the line of travel of the shovel blade at which time the trapped material is forcibly released from between the blades and is agitated and aerated during the release.

The invention primarily consists of a wheel supported, power driven, or animal drawn wheeled vehicle to which my attachment is fixed and which has means for predetermining the precise depth to which the cultivation is to be made effective and to simultaneously completely break up the surface of the soil and carry and redistribute the same at the rear of the tractor. Provision is made to cultivate parallelly disposed strips with a space being left therebetween that is reconditioned at the next round of the vehicle. Settable means are provided for predetermining the depth at which the tilling is to be made effective and for also predetermining at what point the material is to be released from the wheels.

One of the objects of my invention is to provide a tilling machine that will thoroughly, completely and uniformly plow, cultivate, till and aerate the top surface of the ground simultaneously.

A further object of my invention consists in providing a simply constructed device adapted for use in conjunction with power, or animal draft wheel supported vehicles.

A still further object of my invention consists in providing a device that will be relatively long lived, comprised of a minimum number of parts and that may be used over relatively long operating periods for the service intended with minimum repair and operating expense.

A still further object of my invention consists in providing a tilling machine that will be effective and efficient in its operation.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 4 is a sectional plan view of the tractor wheel to which the shovel members are attached, the same being taken on line 4—4 of Fig. 1, looking in the direction indicated.

Fig. 5 is a fragmentary, sectional side view of the shovel portion of the tractor wheel, illustrating the same in position for tilling and for releasing the cultivated material from the tractor wheel.

Like reference characters refer to like parts throughout the several views.

Figures 1, 2, 3:
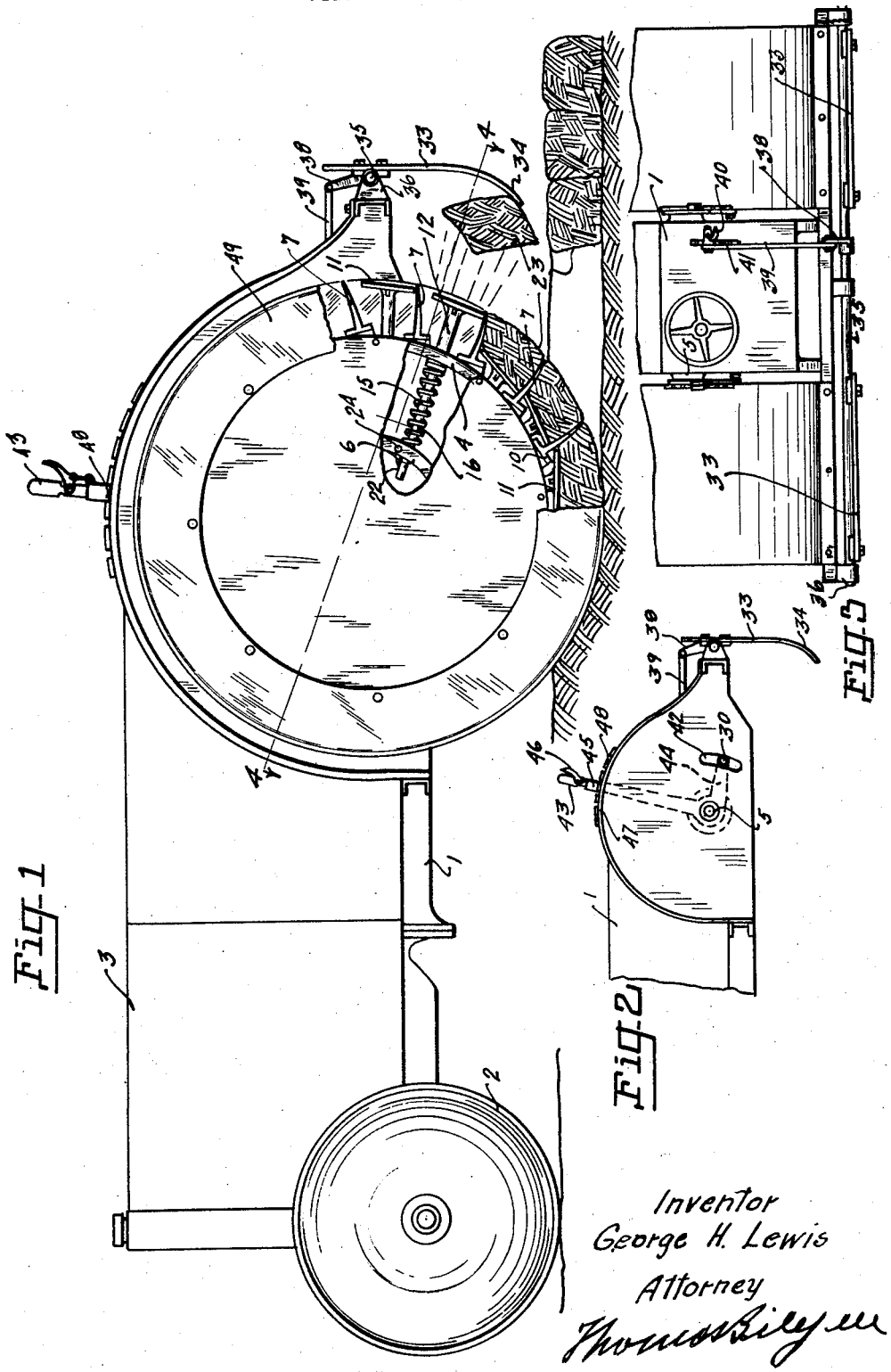
Fig. 1 is a side elevation, partially in section, of the completed device.
Fig. 2 is a fragmentary, sectional side elevation of the assembled device illustrating means for predetermining the point of discharge of the material and the angle of discharge of the material being cultivated.
Fig. 3 is a fragmentary, sectional top plan view of the mechanism illustrated in Fig. 2.

I have here shown my device attached to an engine driven tractor, but I do not wish to be limited to power tractors as the same is susceptible of being used with animal draft tractors with equal facility. For the purpose of this description my device is shown mounted upon a power driven tractor, of which the chassis is illustrated at 1. Front steering wheels 2 are mounted upon the front end of the tractor. The tractor is powered by a gasoline power operated prime mover not here shown, but being disposed beneath the hood 3. A rim 4 is adapted to the axle 5 by any suitable connecting means and a secondary rim, or hub 6 is provided between the primary rim 4 and the hub 5. A plurality of spaced shovel members 7 are removably secured to the primary rim 4. This may be best accomplished by placing of shims 8 upon the outer peripheral surface of the primary rim and having suitable fastening means 9 passing through the base flange 10 of the shovel members and through the shims 8.

A compressible head 11 is disposed between each of the adjacent shovel blades. The compressible head is mounted upon a shaft 12. The shaft is adapted for being passed through an opening 13 disposed within the primary rim. A set collar 14 is mounted upon the shaft 12 and a compressible member, as a coil spring 15, is disposed about the stem 16 of the shaft 12. The stem 16 passes through an opening 17 disposed in registerable alignment with the opening 13 disposed within the primary rim. The opening 17 is disposed within the secondary rim. As the shovel point engages the surface of the earth to be tilled the compressible head 11 is pushed downward and between the shovel members. The depth at which the plowing, or tilling is to occur may be predetermined by placing a split collar 19 about the shaft 12 and between the compressible head and the outer surface of the primary tractor wheel.

A plurality of spaced shoulder stops 21 are disposed upon one side of each of the stems, and a pawl 22 is disposed in registry with the shoulder stops and is adapted to engage the same and to maintain the compressible head locked against the reacting element 15 until released. The purpose of the arrangement is to maintain a slug of earth 23 between the respective shovel members and to carry the same around until released. The point of release is predetermined by the character of the soil being plowed, or cultivated and the amount of agitation that may be required in releasing the same from between the respective shovel members.

A shaft 24, illustrated in Fig. 4, is disposed transversely of the wheel member and is supported within the respective housings 25 and 26. Each of the compressible heads is adapted for being engaged, supported and locked by more than one locking pawl here shown as two in number. The locking pawl 22 is fixedly secured to the shaft 24. The other locking pawl 28, is rockably disposed upon the shaft 24 and is adapted for being urged toward the stem of the compressible head by a reacting element, as a coil spring 29. An adjustable pin 30 is positioned within the housing blading 31, and a crank 32 is removably disposed upon the inner end of the pawl carrying shaft 24. The pin 30 is disposed in the line of travel of the crank and when the predetermined position is reached, where the slug of material is to be released between the shovel members, the pawls are released from the stems and the reacting element 15 causes the compressible head to be returned to normal position, and the slug of material to be turned over or agitated in the desired manner is forced out of the head. An adjustable shield 33 is disposed in the line of travel of the slug of material. The shield has a curved tip 34 and when the slug of material strikes the tip it is arranged and positioned so as to turn the material bottom side up. In soddy or homogeneous material, the shield will remain intact, but in reverse position in which it is normally found. In relatively loose material the agitation will be complete and the surface will be left suitable for sowing, or other crop reception without additional cultivation. The adjustable shield 33 is secured to a shaft 35. The shaft is journaled within suitable journal blocks 36 that are mounted upon the frame member 37 of the tractor. A lever 38 is also mounted upon the shaft 35. A link 39 connects the lever 38 with an operating lever 40. The operating lever 40 is adapted for operating in conjunction with a quadrant 41 to thereby set and position the shield 33 to the desired angle and distance from the compressible heads.

The adjustable stop pin 30 is adapted for being actuated in an arcuate slot 42, and for being positioned by a lever 43 to one arm 44 of which the adjustable pin 30 is secured. The actuating lever 43 has a locking pawl 45 associated therewith that is adapted for being manipulated by the adjustable hand lever 46. The pawl is adapted for being positioned within notches 47 that are disposed upon the outer surface of the quadrant 48. A colter 49 is disposed at one or either side of the primary rim and at one, or both ends of the shovel members to cut the surface to be plowed. In fallow ground these colters may be removed, but in soddy material they are essential.

While the form of mechanism herein shown and described is admirably adapted to fulfill the objects primarily stated, it is to be understood that it is not intended to confine the invention to the one form of embodiment herein shown and described as it is susceptible of embodiment in various forms, all coming within the scope of the claims which follow.

What I claim is:

1. In a device of the class described, the combination of a plow frame, wheel supports for the plow frame, primary and secondary rims spaced apart and forming the driving wheels, shovel members spaced apart and removably secured to the primary rims, compressible heads disposed between the shovel members, shafts extending through the rim members and having the compressible heads secured thereto upon their outer ends, means for limiting the distance that the compressible heads are permitted to move toward the primary rims and the depth the shovels will be permitted to enter the ground, reacting elements disposed about the shafts, means for locking the shovel supporting shafts when the heads are compressed, adjustable means for unlocking the shafts and for releasing the shovel at a predetermined position in the line of rotation of the driving wheels and an adjustable shield disposed in the line of release of the compressible head.

2. In a device of the class described, the combination of a chassis, wheel supports for the chassis, shovel members spaced apart and adjustably secured to the rims of the wheel supports, compressible heads disposed between the shovel members and adapted to release the earth trapped between the shovel members at a settable position within the line of travel of the wheel supported shovel members, means for limiting the depth of penetration of the shovel members, and an adjustable shield disposed in the path of the earth released from between the shovel members.

3. In a device of the class described, the combination of a wheel supported chassis, shovel members removably secured to the rims of the wheels, means disposed between the shovel members and adapted for being compressed when the shovel members penetrate the earth to be tilled, means for releasing the compressible members for releasing the earth carried between the shovel members at a settable point and an adjustable shield disposed in the path of release of the materials carried between the shovel members.

4. In a device of the class described, in combination with a tractor, of primary and secondary rims, spaced apart and adapted for being driven by the driving axle of the tractor, shovel members spaced apart and removably secured to the primary rim, movable members disposed between the shovel members, reacting elements associated with the movable members, and means for locking the movable members when depressed between the shovel members, and means for releasing the movable members at a predetermined position.

5. In a device of the class described, in combination with a tractor, comprising primary and secondary rims, spaced apart and adapted for being driven by the driving axle of the tractor, shovel members spaced apart and adjustably secured to the primary rim, compressed heads disposed between the shovel members, and adapted for being repressed between the blades when the shovel members are made to penetrate the earth to be plowed, reacting elements for returning the compression heads to normal position, means for locking the compression heads in repressed position, and adjustable means for unlocking the compression heads at a predetermined position.

6. In a device of the class described, the combination of a tractor, wheel, shovel members spaced apart and removably secured to the tractor wheel, compressible heads disposed between the shovel members and adapted for being moved toward and away from the center of rotation of the tractor wheel, means for locking the compressible head and settable means for unlocking the compressible head at a predetermined point.

GEORGE H. LEWIS.